July 4, 1939.                W. THOMAS                2,164,670
                      POWER TRANSMISSION UNIT
                       Filed Dec. 13, 1937

INVENTOR
WILLIAM THOMAS
BY   W E Beatty
      ATTORNEY

Patented July 4, 1939

2,164,670

UNITED STATES PATENT OFFICE 2,164,670

POWER TRANSMISSION UNIT

William Thomas, Glendale, Calif., assignor to Warner Bros. Pictures, Inc., New York, N. Y., a corporation of Delaware Application December 13, 1937, Serial No. 179,517

4 Claims. (Cl. 74—421)

This invention relates to power transmission units and has particular reference to speed changing gear transmission units wherein different sets of gears are selectively employed to transmit different power speeds from a motor to a driven device.

One object of the present invention is to selectively change the speed of power transmission between a motor and a device driven thereby.

Another object is to readily interchange one gear transmission unit for another of a different speed ratio.

Another object is to produce a compact gear transmission unit.

Another object is to permit a motor to be changed in position relative to a device driven thereby while coupled thereto.

Another object is to simplify the manufacture of the gear transmission unit.

The manner in which the above and other objects are accomplished will be readily understood from the following specification read in conjunction with the accompanying drawings wherein.

The invention is particularly applicable to motion picture cameras of the type wherein a constant speed motor supported by the camera is employed for driving the various mechanisms in the camera.

Figure 1:
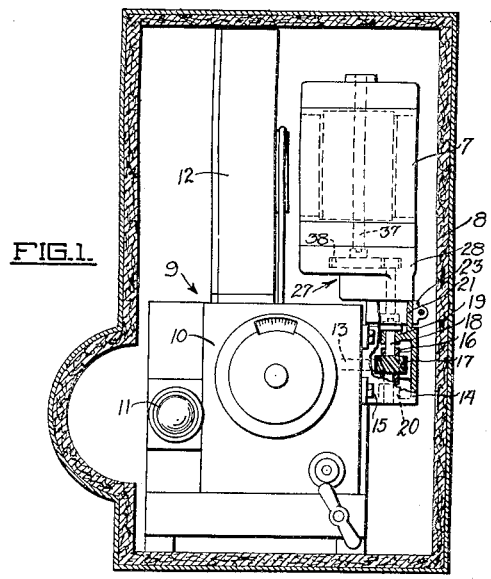
Fig. 1 is a rear elevation view of a motion picture camera and motor drive therefor with parts in section embodying the present invention.
Figure 3:
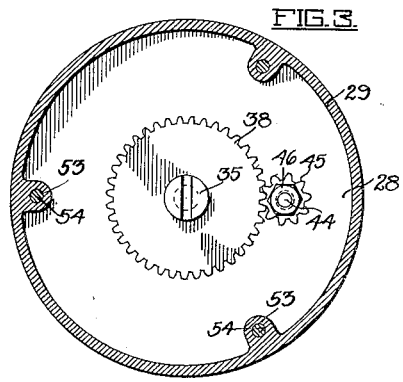
Fig. 3 is a transverse sectional view taken along the line 3—3 of Fig. 2.

Referring now to Fig. 1, the motion picture camera 9 of which a rear view thereof is of conventional construction, comprising a camera body 10 with a focusing tube 11 and a film magazine 12 carried thereby. A constant speed electric motor 7, carried by the camera body 10 in a manner hereinafter described, is provided to drive the various camera mechanisms. Motor 7 is preferably of the synchronous type such as is commonly employed to drive motion picture cameras at a constant speed of 24 frames per second. To prevent the noise of the various moving parts of camera 9 and driving motor 7 from affecting the recording of sound incident to photographing by camera 9 both the camera and its motor are enclosed in a soundproof casing 8. Casing 8 closely fits the camera and its associated parts so as to present a portable unit which is as small and compact as possible. A window (not shown) at the front of the camera 9 permits photographing by the camera while it is in the casing 8.

The various film advancing and shutter mechanisms (not shown) of camera 9 are driven through a camera drive shaft indicated by the dotted lines 13. One end of shaft 13 extends into an adaptor casing 14 secured to one side of the camera body 10 by bolts 15, and is journalled therein. A helical gear 16 secured to the drive shaft 13 within the adaptor 14 meshes with a second helical gear 17 secured on a vertically extending shaft 18 rotatably journalled in bearings 19 and 20 formed in the adaptor 14.

Figure 2:
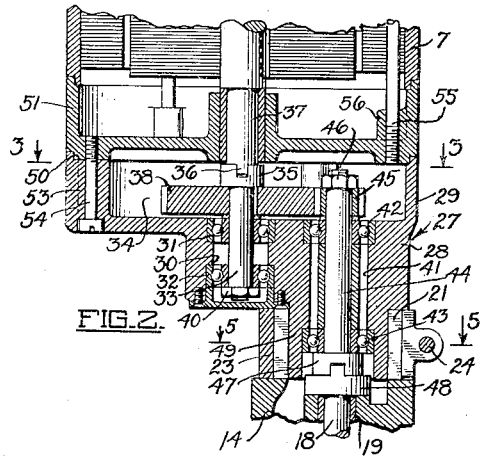
Fig. 2 is a sectional view through a portion of the motor drive of Fig. 1 including the readily removable gear transmission unit of this invention.
Figure 5:
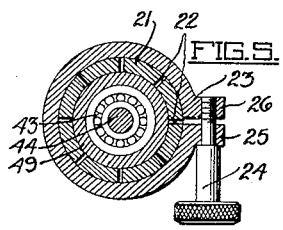
Fig. 5 is a transverse sectional view taken along the lines 5—5 of Fig. 2.

As shown in Figs. 2 and 5, the upper end of the adaptor 14 is formed into a circular sleeve or socket 21, having a plurality of radial slits 22 provided therearound. A circular clamp 23 in the form of a split sleeve engages the outer periphery of sleeve 21 and is adapted to clamp the various segments of sleeve 21 by means of a clamp screw 24 which passes through a projecting lug 25 on one side of the split portion of the clamp 23 and is threaded in the opposing lug 26 formed on the opposite side of the slit portion.

On reference to Fig. 2 the gear transmission unit, generally indicated at 27, comprises a circular casing 28 having a large annular flange 29 extending from the upper side thereof. A bearing bore 30 is formed on the casing 28 concentric with the flange 29 to receive a pair of ball bearings 31 and 32 at either end thereof. A gear shaft 33 is rotatably mounted in the bearings 31 and 32, the upper end thereof extending within a well 34 formed by the flange 29. The end of shaft 33 extending within well 34 terminates in a female coupling member 35 which is adapted to couple the shaft 33 to a male coupling portion or member 36 formed on the end of the motor shaft 37 of motor 7 on axial movement of the casing 28. The coupling member 35 also acts as a retainer for a spur gear 38 suitably keyed to the gear shaft 33 within the well 34. A lock nut 40 is threaded on the lower end of the shaft 33 to prevent axial movement of the shaft 33 within the bearings 31 and 32.

A second bearing bore 41 is formed in the casing 28 eccentric but parallel with the bore 30. A pair of ball bearings 42 and 43 are mounted at either end of the bore 41 to rotatably support a second gear shaft 44. A second spur gear 45 is keyed to the upper end of shaft 44 extending within the well 34 and meshes with the gear 38. A lock nut 46 is threaded on the end of the shaft 44 to retain the gear 45 thereon and to prevent axial movement of shaft 44.

A female coupling member 47, similar to that of 35, is formed on the lower end of the shaft 44 and is adapted, on axial movement of the casing 28 to engage a mating male coupling member 48 (Fig. 2) formed on the upper end of the shaft 18 in adaptor 14 to couple the shaft 44 through the shaft 18 to the drive shaft 13 of the camera 9. A circular flange or sleeve 49 extends downwardly from the casing 28, concentric with the shaft 44, and surrounds the coupling member 47. As shown in Fig. 2, the flange 49 is adapted to be removably inserted in the socket 21 and to be clamped therein by the clamp 23 when the coupling members 47 and 48 are interengaged. The socket 21 of adaptor 14 thus forms a support for the gear unit 27.

A circular groove 50 is formed around the upper edge of the flange 29 to receive the mating portion of an end bell 51 of motor 7. Bosses 53 are formed integrally with the flange 29 and spaced therearound. These bosses 53 have vertically extending holes to receive bolts 54. Bolts 54 are adapted to be threaded within the end bell 51 to removably secure the motor 7 to the gear unit 27 in driving relation therewith. The end bell 51 is suitably secured to the casing of the motor 7 by longitudinally extending bolts 55 threaded at one end thereof in holes provided in bosses 56 integrally formed on the end bell 51.

Figure 4:
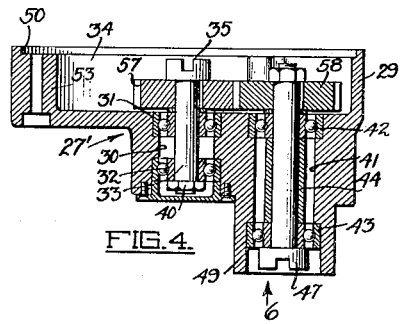
Fig. 4 is a sectional view through a gear transmission unit similar to that shown in Fig. 2, but having a different gear ratio.
Figure 6:
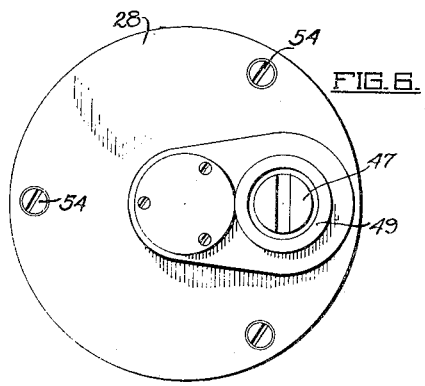
Fig. 6 is a plan view of the transmission unit, and is taken in the direction of the arrow 6 in Fig. 4.

On reference to Fig. 4 it will be noted that the gear unit 27' illustrated therein is of the same size and configuration as the gear unit 27 of Fig. 2 thus permitting interchangeability of these two gear units. However, unit 27' has a set of gears 57 and 58 therein which are of different diameters than the corresponding gears 48 and 45, respectively, of the unit 27, thus resulting in a different speed ratio between the input and output connections thereof.

The unit 27' may be readily interchanged with the unit 27 by loosening the split sleeve clamp 23 to allow the unit 27 to be lifted clear of the socket 21, which will simultaneously uncouple the shaft 44 from the shaft 18. Then the three bolts 54 are removed to permit the gear unit 27 to be removed from the end bell 51 of motor 7 and the shaft 33 thereof to be uncoupled from the motor shaft 37. Unit 27' is then fastened to the end bell 51 of motor 7 by bolt 54 and the depending flange 49 of the unit 27' is inserted and secured in the socket 21.

Due to the abaxial relation of the major portion of the unit 27 (or 27') and motor 7 with the circular socket 21, the unit may be angularly adjusted in any position about the axes of the shafts 18 and 44 to clear any obstructions or attachments on either the camera 9 or the soundproof casing 8. This may be accomplished while the shafts 18 and 44 are coupled together merely by loosening the clamp 23, thereby releasing the frictional engagement of the slitted socket 21 with the depending sleeve 49 of casing 28 to permit sleeve 49 to turn in socket 21.

A number of units similar to those of 27 and 27', but of different gear ratios, may be made up to be selectively used in the camera drive to permit driving the camera at a speed commensurate with the requirements of a particular photographic shot while using a constant speed motor. This is particularly useful in photographing miniature animated scenes where the photographing speed is determined by the size of such scene.

As an example, one unit (27') may contain gears with a one to one speed ratio to drive the camera at a normal speed of 24 frames per second. Other units may have gear ratios which increase in steps of 12 frames per unit. For example, one unit may be capable of driving a camera at 36 frames per second from a normal speed camera motor while another unit may be capable of driving a camera at 48 frames per second from the same motor. Other units may be employed with still higher speed ratios.

I claim:

1. A gear unit comprising a casing, an annular flange extending from one side of said casing to form a well, a seat on said flange for receiving the end of a motor, a gear, means for rotatably supporting said gear in said well, a coupling member concentric with said flange and operatively connected to said gear, said coupling member being adapted to couple said gear to said motor on relative axial movement of said motor and said casing, a second gear, means for rotatably supporting said second gear in said well in mesh with said first mentioned gear, a bearing housing extending from said casing and adapted to fit a second casing, and a coupling member concentric with the bore of said bearing housing, said coupling being operatively connected to said second gear and adapted to couple said second gear to a coupling member rotatably supported by said second casing on relative axial movement of said first and second mentioned casings.

2. A gear unit comprising a casing, an annular flange extending from one side of said casing, said flange forming a well and being adapted to fit a second casing, a shaft rotatably carried by said first mentioned casing and extending concentric with said flange, a coupling member on that end of said shaft which extends within said well, said coupling member being adapted to couple said shaft to a second coupling member on axial movement of either of said casings, a gear secured to said shaft, a second annular flange extending on the side of said first mentioned casing opposite said first mentioned flange and eccentric with said first mentioned flange, said second flange forming a well and being adapted to fit a third casing, a second shaft rotatably carried by said first mentioned casing and extending concentric with said second flange, a coupling member on that end of said second shaft which extends within said well formed by said second flange, said last mentioned coupling member being adapted to couple said second shaft to a fourth coupling member on axial movement of either of said first and third mentioned casings, and a gear secured to said second shaft and meshing with said first mentioned gear.

3. A gear unit comprising a circular casing having an annular flange extending from one side thereof, the said flange forming a well and being adapted to fit a second casing, a bearing bore in said first mentioned casing concentric with said flange, bearing means in said bore, a gear shaft rotatably carried in said bearing means and having one end thereof extending into said well, a gear in said well and carried by said shaft, a coupling member on one end of said shaft and situated in said well, said coupling member retaining said gear on said shaft and adapted to couple said shaft to a second coupling member on axial movement of either of said casings, a second bearing bore formed in said first mentioned casing eccentric with said flange, a second annular flange extending from the side of said first mentioned casing opposite said first mentioned flange and concentric with said last mentioned bearing bore, bearing means in said last mentioned bore, said last mentioned flange being adapted to fit a third casing, a gear shaft rotatably carried in said last mentioned bearing means and extending at one end thereof into said well and extending at the opposite end thereof into a well formed by said last mentioned flange, a coupling member on the end of said last mentioned shaft extending in said last mentioned well and adapted to couple said last mentioned shaft to a fourth coupling member on axial movement of either of said first and third mentioned casings, and a second gear situated in said first mentioned well and carried on said last mentioned shaft, said second gear meshing with said first mentioned gear.

4. A gear unit comprising a casing having an annular flange forming a well, means on said flange adapted to receive the end of a motor housing having a shaft therein, means for securing said casing to said motor housing, a pair of parallel bearing bores in said casing, a shaft in one of said bearing bores in alignment with the motor shaft when assembled therewith and terminating in a coupling member below the top of said well, a gear in said well on said last mentioned shaft, a second shaft in said second bearing bore and terminating in a coupling member within the bottom of said second bearing bore, and a gear in said well on said second shaft enmeshed with said first mentioned gear.

WILLIAM THOMAS.